United States Patent
Zhang et al.

(10) Patent No.: US 11,269,101 B2
(45) Date of Patent: Mar. 8, 2022

(54) METHOD AND SYSTEM OF DIRECT GAS RESERVOIR DETECTION USING FREQUENCY SLOPE

(71) Applicant: Saudi Arabian Oil Company, Dhahran (SA)

(72) Inventors: Si-Hai Zhang, Dhahran (SA); Maher Al Marhoon, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 388 days.

(21) Appl. No.: 16/385,903

(22) Filed: Apr. 16, 2019

(65) Prior Publication Data

US 2020/0333488 A1 Oct. 22, 2020

(51) Int. Cl.
*G01V 1/30* (2006.01)
*G01V 1/24* (2006.01)
(Continued)

(52) U.S. Cl.
CPC ............... *G01V 1/307* (2013.01); *G01V 1/24* (2013.01); *G01V 1/46* (2013.01); *G01V 1/50* (2013.01)

(58) Field of Classification Search
CPC . G01V 1/307; G01V 1/24; G01V 1/46; G01V 1/50; G01V 1/301; G01V 1/306
See application file for complete search history.

(56) References Cited

U.S. PATENT DOCUMENTS

| | | | |
|---|---|---|---|
| 6,473,695 | B1 | 10/2002 | Chutov et al. |
| 6,982,927 | B2 | 1/2006 | Taner |

(Continued)

FOREIGN PATENT DOCUMENTS

| | | | |
|---|---|---|---|
| CN | 103064112 A | * | 4/2013 |
| CN | 103527184 | | 4/2016 |

(Continued)

OTHER PUBLICATIONS

Dilay and Eastwood, "Spectral analysis applied to seismic monitoring of thermal recovery," the Leading Edge, vol. 14, Nov. 1995, 6 pages.

(Continued)

*Primary Examiner* — Daniel Pihulic
(74) *Attorney, Agent, or Firm* — Fish & Richardson P.C.

(57) ABSTRACT

The present disclosure describes methods and systems, including computer-implemented methods, computer program products, and computer systems for direct gas reservoir detection using frequency slope. One computer-implemented method includes receiving seismic data corresponding to a target formation. Further, the method includes based on a time-frequency analysis of the seismic data, generating a representation of a time-variant frequency response of the seismic data. Yet further, the method includes generating a frequency spectrum for each of one or more locations within the target formation using the representation of the time-variant frequency response. Additionally, the method includes calculating one or more frequency slopes between a peak frequency and a maximum frequency of each frequency spectrum. The method also includes based on the one or more frequency slopes, determining for each location whether gas are present.

20 Claims, 10 Drawing Sheets
(2 of 10 Drawing Sheet(s) Filed in Color)

(51) Int. Cl.
*G01V 1/46* (2006.01)
*G01V 1/50* (2006.01)

(56) References Cited

U.S. PATENT DOCUMENTS

| | | |
|---|---|---|
| 7,243,029 B2 | 7/2007 | Lichman et al. |
| 7,729,862 B2 | 6/2010 | Dewarrat |
| 7,876,643 B2 | 1/2011 | Wiley et al. |
| 9,551,799 B2 | 1/2017 | Wiley et al. |
| 2020/0333488 A1* | 10/2020 | Zhang ................ G01V 1/24 |

FOREIGN PATENT DOCUMENTS

| | | | | |
|---|---|---|---|---|
| CN | 106526670 A | * | 3/2017 | ............ G01V 1/46 |
| CN | 107748387 | | 3/2018 | |
| CN | 104765063 | | 8/2018 | |
| CN | 109001800 | | 12/2018 | |
| CN | 110244363 A | * | 9/2019 | |
| WO | WO-2020214577 A1 | * | 10/2020 | ............ G01V 1/46 |

OTHER PUBLICATIONS

Xue et al., "Application of the empirical mode decomposition and wavelet transform to seismic reflection frequency attenuation analysis," Journal of Petroleum Science and Engineering, Oct. 2014, 122:360-370.

PCT International Search Report and Written Opinion in International Appln. No. PCT/US2020/028095, dated Jul. 21, 2020, 114 pages.

GCC Examination Report in GCC Appln. No. GC2020-39539, dated Aug. 12, 2021, 4 pages.

* cited by examiner

METHOD AND SYSTEM OF DIRECT GAS RESERVOIR DETECTION USING FREQUENCY SLOPE

TECHNICAL FIELD

This disclosure relates to improving seismic methods of gas detection.

BACKGROUND

Many of the current seismic methods of gas detection rely on an analysis of reflection amplitude of seismic data. Reflection amplitude, however, is affected by many variables including lithology, porosity, and fluid content of geological formations. Given the number of variables that affect reflection amplitude, accurately deriving one of those variables is difficult and unreliable, particularly fluid or gas content, from the reflection amplitude.

SUMMARY

The present disclosure describes methods and systems, including computer-implemented methods, computer program products, and computer systems for direct gas reservoir detection using frequency slope. One computer-implemented method includes receiving seismic data corresponding to a target formation; based on a time-frequency analysis of the seismic data, generating a representation of a time-variant frequency response of the seismic data; generating a frequency spectrum for each of one or more locations within the target formation using the representation of the time-variant frequency response; calculating one or more frequency slopes between a peak frequency and a maximum frequency of each frequency spectrum; and based on the one or more frequency slopes, determining for each location whether gas are present.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware, installed on the system that in operation causes the system to perform the actions. One or more computer programs can be configured to perform particular operations or actions by virtue of including instructions that when executed by data processing apparatus cause the apparatus to perform the actions.

The foregoing and other implementations can each, optionally, include one or more of the following features, alone or in combination:

A first aspect, combinable with the general implementation, the time-frequency analysis is based on a continuous wavelet transform.

A second aspect, combinable with any of the previous aspects, the time-frequency analysis of the seismic data generates a time-scale map, and where generating a representation of a time-variant frequency response of the seismic data includes converting a time-scale map to the representation of the time-variant frequency response.

A third aspect, combinable with any of the previous aspects, the representation of the time-variant frequency response including n mono-frequency cubes, where each cube represents a time-variant response of each trace of the seismic data at a respective frequency.

A fourth aspect, combinable with any of the previous aspects, a frequency range of the n mono-frequency cubes is from $f_{min}$ to $f_{max}$, and where calculating $f_{max}$ includes: performing spectral decomposition on the seismic data to generate an average frequency spectrum of the seismic data; identifying a peak frequency in the average frequency spectrum, wherein a peak amplitude occurs at the peak frequency; calculating a maximum amplitude as a product of the peak amplitude and a predetermined factor; and designating a frequency at which the maximum amplitude occurs as $f_{max}$.

A fifth aspect, combinable with any of the previous aspects, where using the representation to generate a frequency spectrum for each of one or more locations within the target formation includes: extracting, from the representation of the time-variant frequency response, frequency data corresponding to the location; and based on the extracted frequency data, constructing a frequency spectrum for the location.

A sixth aspect, combinable with any of the previous aspects, further comprising based on the one or more frequency slopes, generating a frequency-slope map of the target formation, where the frequency-slope map visually indicates, for each location, whether gas are present; and outputting the frequency-slope map on a display device.

Particular implementations of the subject matter described in this specification can be implemented in order to improve seismic methods of gas detection. The improved methods generate a more accurate representation of the location of gas reservoirs than representations currently achieved in practice. Furthermore, the improved methods facilitate accurate drilling operations for extracting gas from an area of interest.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the following description. Other features and advantages of the disclosure will be apparent from the description and drawings, and from the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

The following detailed description describes systems and methods to improve seismic methods of gas detection, and is presented to enable a person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from the scope of the disclosure. Thus, the present disclosure is not intended to be limited to the described or illustrated implementations, but is to be accorded the widest scope consistent with the principles and features disclosed.

Scattering theory indicates that a geological formation containing gas causes energy attenuation in seismic waves passing through the formation, particularly in the high-frequency components of the waves. Based on this finding, high-frequency attenuation of seismic waves can be used to detect gas deposits. One way of detecting high-frequency attenuation is by generating a frequency spectrum of the seismic data. However, because frequency-dependent attenuation is caused by different variables, merely analyzing the frequency spectrum for attenuated portions does not reliably indicate the presence of gas. An accurate and reliable method for detecting gas using frequency-dependent attenuation is desired.

Disclosed are systems and methods that use the slope of a frequency spectrum to detect high-frequency attenuation indicative of gas. The systems and methods first determine one or more slopes on a high-frequency side of the frequency spectrum. Then, the one or more slopes are analyzed in order to determine whether the one or more frequency slopes are indicative of high-frequency attenuation, and thereby, are indicative of gas. The following example illustrates how high-frequency side slopes can indicate high-frequency attenuation indicative of gas.

Figure 1A:
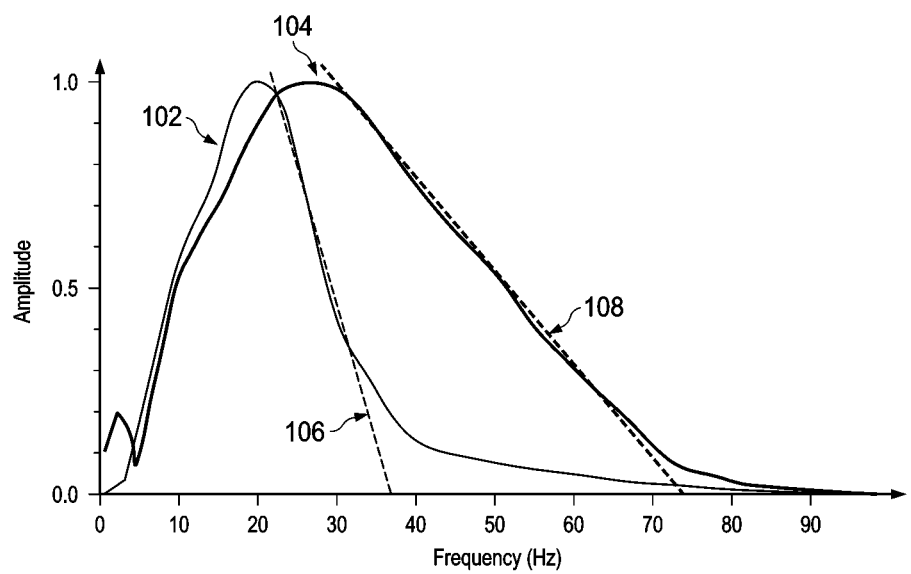
FIG. 1A illustrates two frequency spectra, according to some implementations.

FIG. 1A illustrates two frequency spectra 102, 104 that are associated with different subsurface locations, according to some implementations. Each spectrum represents the frequency response of seismic data collected from one of the locations. For the purpose of this example, one of the locations, location "A," contains a gas deposit and the other location, location "B," does not. Frequency spectrum 102 corresponds to location A and frequency spectrum 104 corresponds to location B.

FIG. 1A also illustrates lines 106, 108 that represent high-frequency side slopes of frequency spectra 102, 104, respectively. As shown by lines 106, 108, frequency spectrum 102 has a much steeper high-frequency slope than frequency spectrum 104. Thus, the high-frequency side slope of frequency spectrum 102 indicates that location "A" contains gas and the high-frequency side slope of frequency spectrum 104 indicates that location "B" does not contain gas. Because location "A" does contain gas and location "B" does not, the high-frequency side slope, as shown by this example, can be used to determine whether a location contains gas.

Figure 1B:
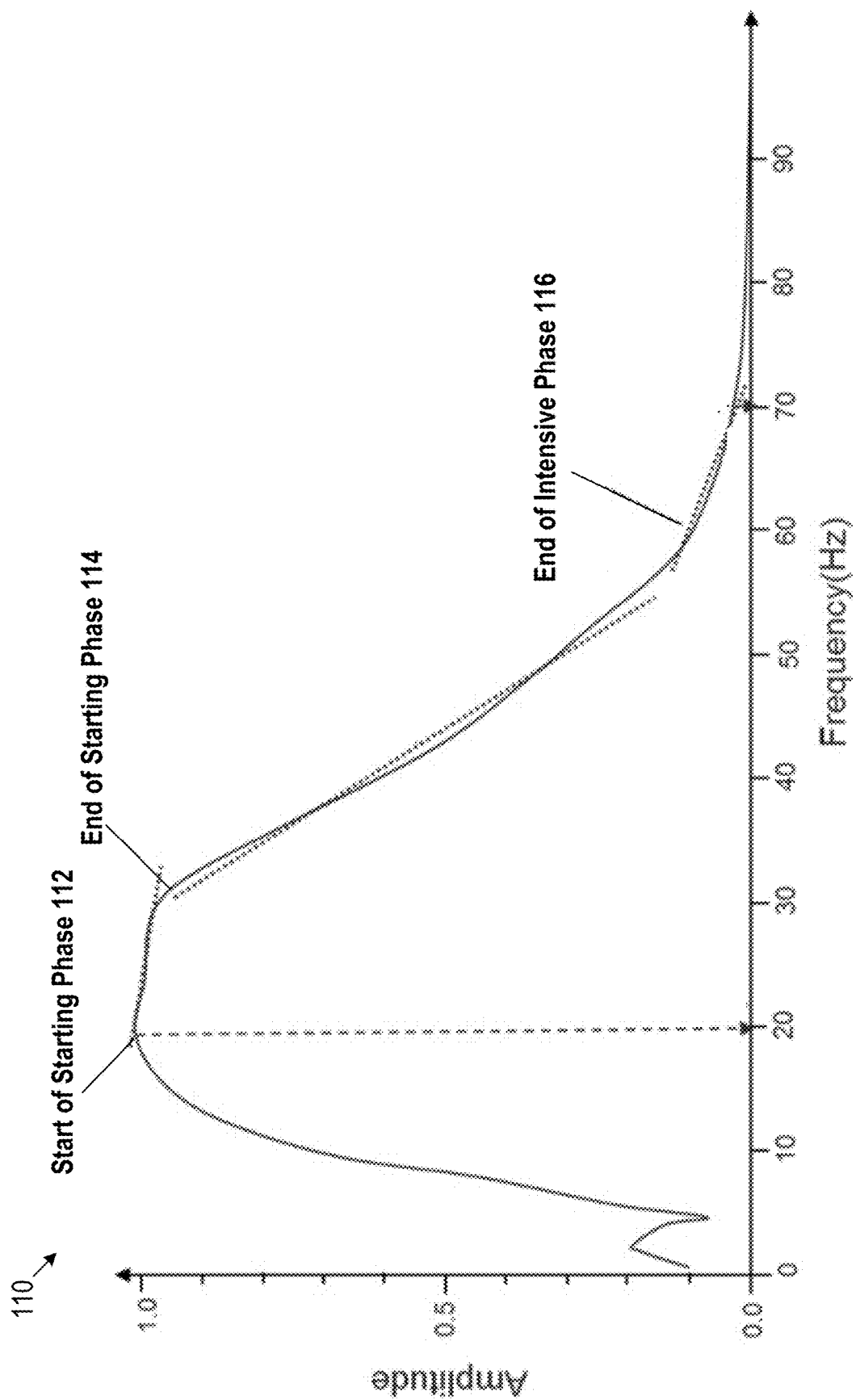
FIG. 1B illustrates a frequency spectrum associated with a gas-bearing region, according to some implementations.

FIG. 1B illustrates another feature of frequency spectra of locations that contain gas, according to some implementations. In particular, such frequency spectra undergo three phases of frequency energy attenuation: a starting phase of frequency energy attenuation, an intensive phase of frequency energy attenuation, and an end phase of frequency energy attenuation. Spectrum 110 is a frequency spectrum of a gas-containing location and illustrates these three phases. Point 112 corresponds to the start of the starting phase of frequency energy attenuation, point 114 corresponds to the end of the starting phase and the start of the intensive phase, and point 116 corresponds to the end of the intensive phase and the start of the end phase.

Figure 2:
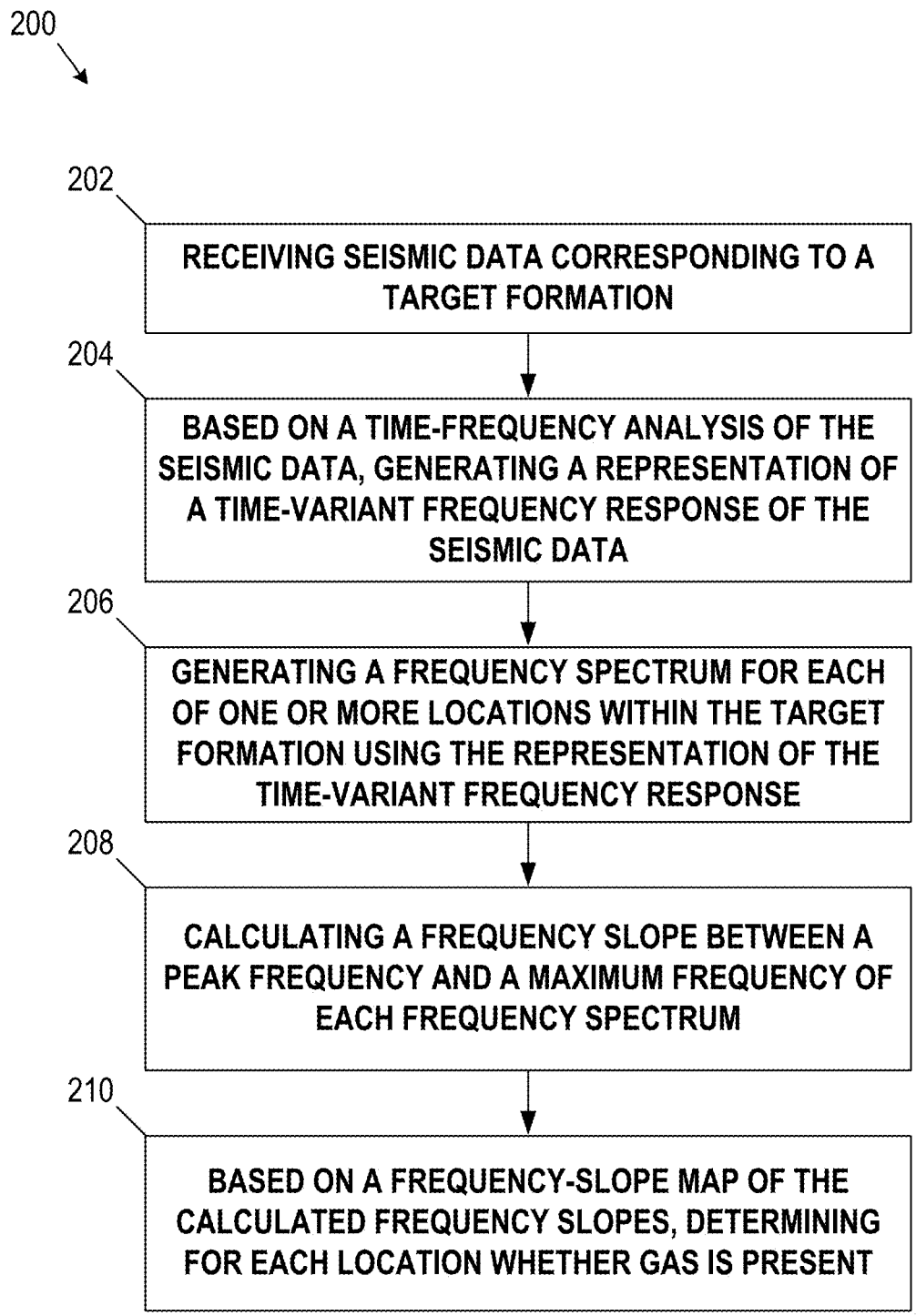
FIG. 2 illustrates a flowchart showing an example method for frequency slope based gas detection, according to some implementations.

FIG. 2 is a flow chart illustrating a method 200 for high-frequency slope based gas detection, according to some implementations. For clarity of presentation, the description that follows generally describes method 200 in the context of the other figures in this description. For example, method 200 can be performed by a computer system described in FIG. 7. However, it will be understood that method 200 may be performed, for example, by any suitable system, environment, software, and hardware, or a combination of systems, environments, software, and hardware, as appropriate. In some implementations, various steps of method 200 can be run in parallel, in combination, in loops, or in any order.

At step 202, method 200 involves receiving seismic data corresponding to a target formation. In an implementation, the seismic data is received in response to a selection of the target formation from an area of interest. The selection can be performed manually by a user or automatically by a computing device or both. Further, the selection indicates a desire to determine whether the target formation contains gas. As an example, a user may select the target formation from a map displayed on a display of a computing device. Other examples of selecting the target formation are possible.

The received seismic data may be a portion of a larger seismic data set. The seismic data set may be a three-dimensional (3D) seismic data volume that is obtained through geophysical exploration that uses sensors to collect raw seismic data. The raw seismic data is made up of individual sensor readings referred to as "traces." Each data point in a trace corresponds to a seismic travel time (t) or depth (z). In order to generate the 3D seismic data volume from the raw seismic data, the traces are summed or "stacked" according to a predetermined relationship, such as common mid-point (CMP) or common depth point (CDP). The resulting 3D seismic data volume serves as a subsurface map of the area of interest.

At step 204, method 200 involves based on a time-frequency analysis of the seismic data, generating a representation of a time-variant frequency response of the seismic data. Here, time-frequency analysis, as opposed to frequency decomposition, is used because spectral content of seismic data varies with time (also referred to as a "nonstationary time series"). In an implementation, the time-frequency analysis uses transforms to characterize the time-variant frequency response of seismic data. In one example, a Short Time Fourier Transform (STFT) is used to characterize the time-variant frequency response.

In another example, a continuous wavelet transform (CWT) is used to characterize the time-variant frequency response of the seismic data. The CWT uses a wavelet to investigate the time-frequency characteristics of the seismic data ("the signal"). In particular, the CWT compares the signal to shifted and compressed or stretched versions of the wavelet. The CWT is defined as the inner product of a family of wavelets $\psi_{(\sigma\tau)}(t)$ and the signal f(t), as shown by equation (1):

$$Fw(\sigma, \tau) = \langle f(t), \psi_{\sigma,\tau}(t) \rangle = \int_{\infty}^{\infty} f(t) \frac{1}{\sqrt{\sigma}} \bar{\psi}\left(\frac{t-\tau}{\sigma}\right) dt, \quad (1)$$

where $\sigma, \tau \in \Re \, (\sigma > 0)$

In equation (1), $\bar{\psi}$ is the complex conjugate of $\psi$, $\sigma$ is a scaling factor, and $\tau$ is shifting factor. Furthermore, the convolution integral is computed in the Fourier domain. Example wavelets used by the CWT include Complex Mexican hat wavelets, fbsp wavelets, Morlet wavelets, Shannon wavelets, and Modified Morlet wavelets. The output, Fw ($\sigma\tau$), is a time-scale map (also referred to as a "scalogram") that has three axes: time as the x-axis, wavelet scale as the y-axis, and CWT coefficient value as the z-axis.

However, the time-scale map does not directly provide frequency information. Therefore, the map does not directly represent the time-variant frequency response of the seismic data. To overcome this deficiency, the time-scale map is converted into a time-frequency representation that represents time-variant frequency response of the seismic data. In one example, the time-scale map is converted using the central frequency of the wavelet. In another example, the time-scale map is converted using the wavelet as an adaptive window.

In an implementation, the time-frequency representation, to which the time-scale map is converted, is made up mono-frequency cubes that represent the time-variant frequency response of the seismic data. The axes of each cube are time, trace number, and amplitude. And each cube represents the time-variant response of each trace of the seismic data at a particular frequency. For instance, a 20 Hertz (Hz) cube represents the time-variant response for the 20 Hz component of each trace in the seismic data.

More specifically, the mono-frequency cubes include "n" cubes between a minimum cube frequency, $f_{min}$, and a maximum cube frequency, $f_{max}$. The number ("n") of mono-frequency cubes depends on the minimum cube frequency, $f_{min}$, maximum cube frequency, $f_{max}$, and a frequency interval, i, and is calculated using equation (2):

$$n = \frac{f\max - f\min}{i} + 1 \quad (2)$$

In an example, the interval i is 1 Hz. In other examples, the interval i is increased to be greater than 1 Hz, perhaps to reduce processing time. The maximum frequency, however, varies for different traces in the seismic data. Therefore, a single maximum frequency, $f_{max}$, is calculated for the purpose of generating the mono-frequency cubes.

Figure 3A:
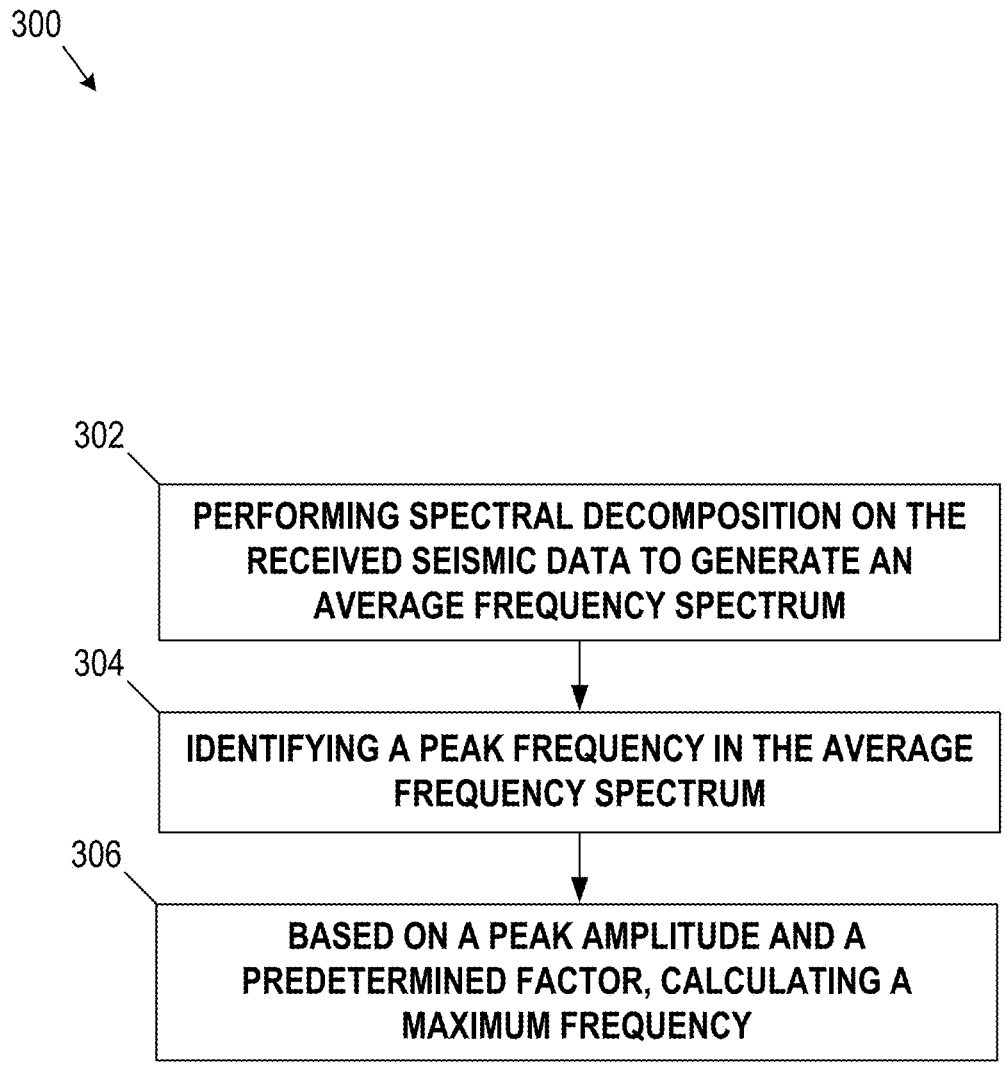
FIG. 3A illustrates a flowchart showing an example method for calculating a maximum frequency in a seismic data set, according to some implementations.

FIG. 3A illustrates a method 300 of calculating $f_{max}$, according to some implementations. At step 302, method 300 involves performing spectral decomposition on the received seismic data in order to generate an average frequency spectrum. Performing spectral decomposition may involve using spectral decomposition methods, such as the Fourier transform, to generate the average frequency spectrum.

At step 304, method 300 involves identifying a peak frequency. The peak frequency is the frequency at which a maximum/peak amplitude occurs.

Subsequently, at step 306, method 300 involves calculating a maximum frequency $f_{max}$ based on the peak amplitude and a predetermined factor. In implementation, $f_{max}$ is the frequency at which a minimum amplitude occurs, where the minimum amplitude is a predetermined percentage of the peak amplitude. For instance, the predetermined percentage may be between 1% and 10%, inclusively. Accordingly, the $f_{max}$ is a frequency at which an amplitude that is 1% to 10% of the peak amplitude occurs. For example, when the predetermined factor is 3%, $f_{max}$ is the frequency at which the amplitude is 3% of the peak amplitude. Note that the predetermined factor may also be expressed in other mathematical forms, such as fractions or ratios. The calculated $f_{max}$ is then used to determine the range and number of mono-frequency cubes that are generated.

Figure 3B:
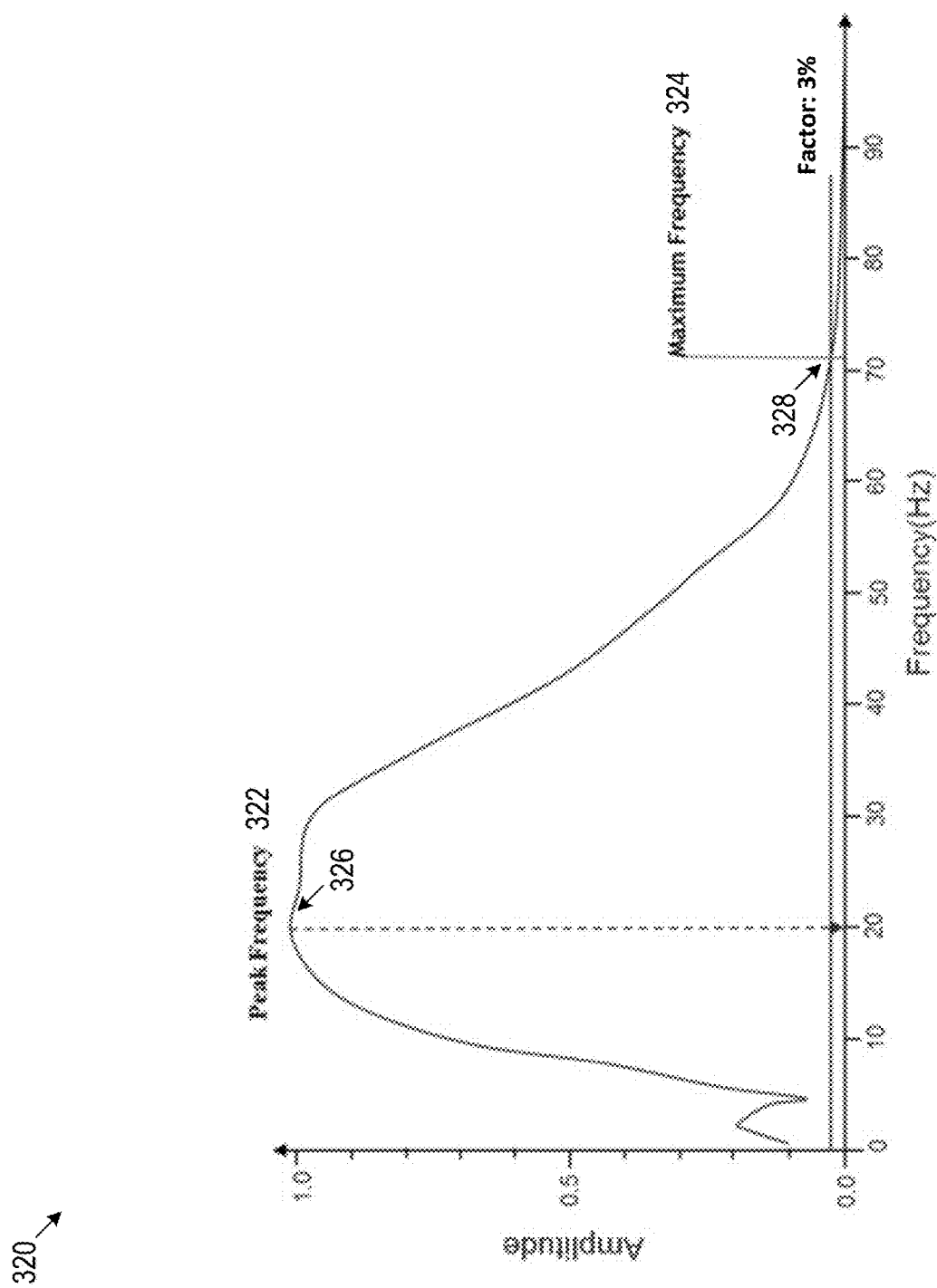
FIG. 3B illustrates an average frequency spectrum, according to some implementations.

FIG. 3B illustrates an average frequency spectrum 320, according to some implementations. As shown in FIG. 3B, a peak amplitude 326 occurs at approximately 20 Hz, and therefore, 20 Hz is identified as the peak frequency 322. Furthermore, the minimum amplitude is defined as 3% of the peak amplitude. The maximum frequency 324 is the frequency at which the minimum amplitude occurs. In this example, a minimum amplitude 328 occurs at the maximum frequency 324 (that falls between 70 and 80 Hz).

Returning to FIG. 2, at step 206, method 200 involves generating a frequency spectrum for each of one or more locations within the target formation using the representation of the time-variant frequency response. Generating a frequency spectrum for multiple locations with the target formation facilitates detecting gas globally within the target formation. The frequency spectrum for each location is indicative of the frequency response of the seismic data associated with that location.

Figure 4A:
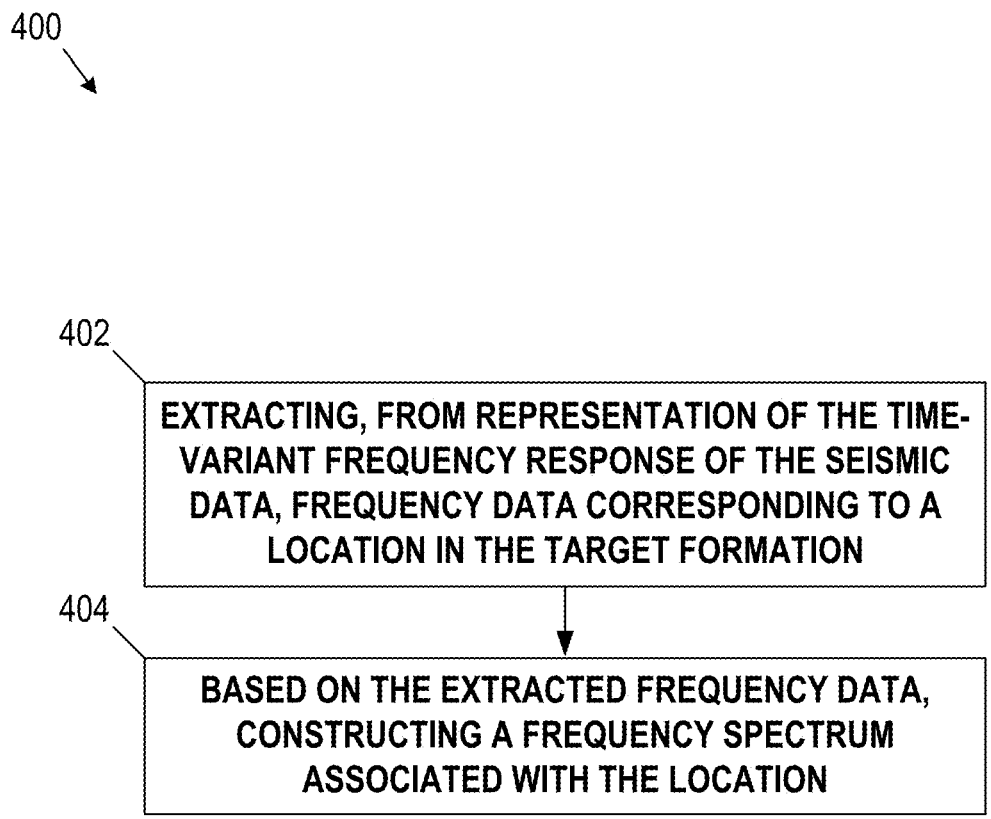
FIG. 4A illustrates a flowchart showing an example method for constructing a frequency spectrum, according to some implementations.

FIG. 4A illustrates a method 400 of constructing a frequency spectrum for a location, according to some implementations. At step 402, method 400 involves extracting, from the representation of the time-variant frequency response of the seismic data, frequency data corresponding to the location. In the implementation where the representation is n mono-frequency cubes, the frequency response of the seismic data reflected from the location is extracted from each mono-frequency cube to generate n frequency components for that location.

Subsequently, at step 404, method 400 involves based on the extracted frequency data, constructing a frequency spectrum for the location. Here, the frequency spectrum is constructed by combining the n frequency components for that location. Steps 402 and 404 are repeated for one or more other locations in the target formation in order to generate the frequency spectrum for each location.

Figure 4B:
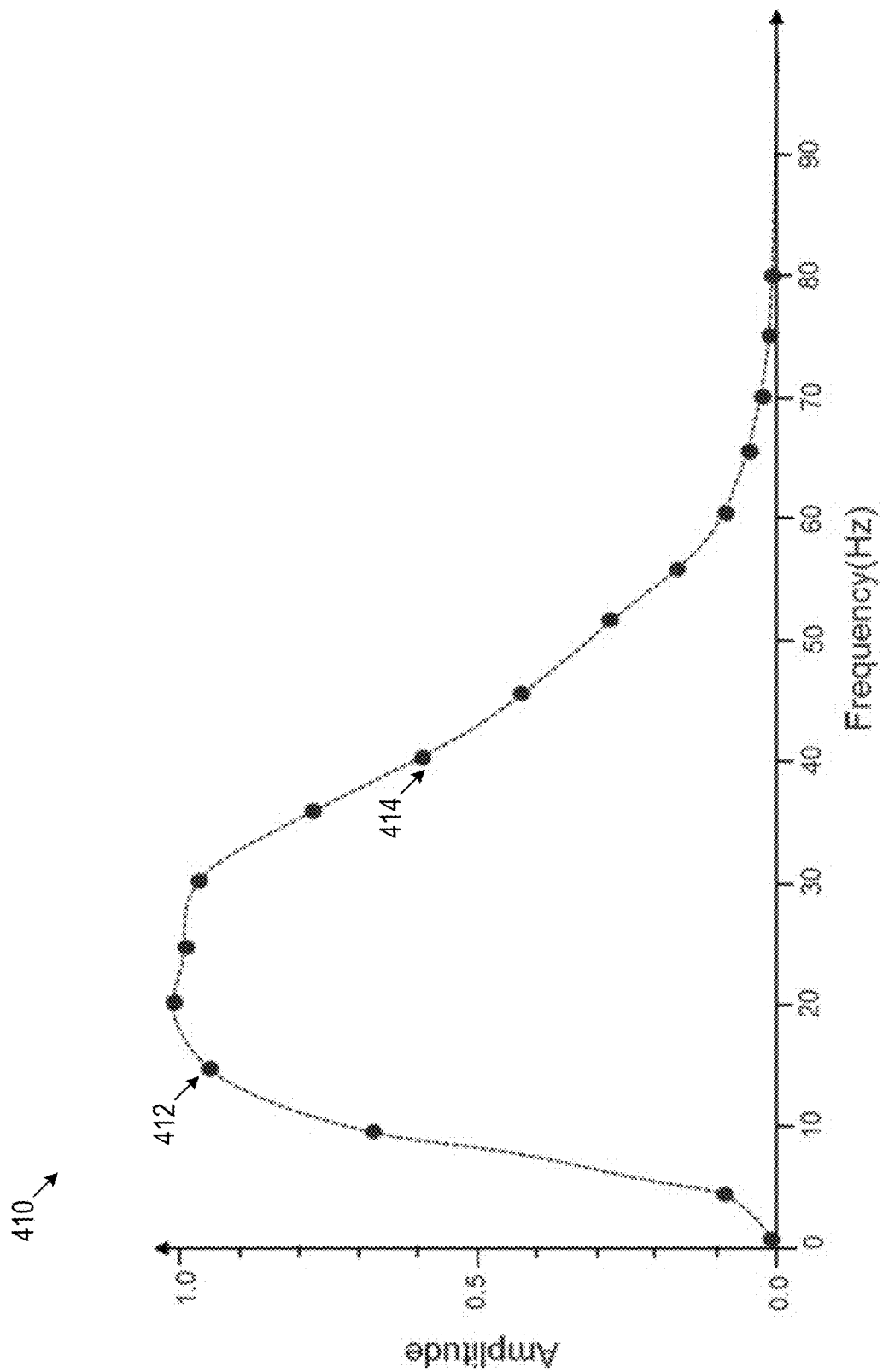
FIG. 4B illustrates a constructed frequency spectrum, according to some implementations.

FIG. 4B illustrates a constructed frequency spectrum 410, according to some implementations. As shown in FIG. 4B, the frequency spectrum 410 is constructed from frequency components, such as components 412, 414, that are each extracted from one of the mono-frequency cubes. In some examples, interpolation is used to connect the frequency components when constructing the frequency spectrum 410.

Returning to FIG. 2, at step 208, method 200 involves calculating a frequency slope between a peak frequency and a maximum frequency of each frequency spectrum. The peak frequency is the frequency at which the peak amplitude in the frequency spectrum occurs. The maximum frequency is a frequency at which an amplitude that is a predetermined factor of the peak amplitude occurs (also referred to above as a minimum amplitude of the frequency spectrum). The frequency spectrum between the peak frequency and the maximum frequency is referred to as a "high-frequency side" of the spectrum. Typically, a seismic frequency range is from 10 to 80 Hz. The peak frequency changes based on data and depth of images, but ranges between 20 to 30 Hz is many cases. "High frequencies" are frequencies that are greater than the peak frequency.

In an implementation, once the high-frequency slope is calculated, the high-frequency side is divided into three pieces and characterized using a linear model that includes one or more piecewise functions in order to calculate the energy attenuation. Given that the one or more piecewise functions approximate the high-frequency side of the spectrum, the one or more slopes of the one or more of the functions approximate the one or more slopes of the three pieces. The slopes of the three pieces, each of which correspond to one of the energy attenuation phases, is then used to calculate the energy attenuation.

In an implementation, the high-frequency side is approximated using one or more polynomial free-knot splines that fit the high-frequency side curve. The knots of the splines are free and capable of coping with rapid change in the curve. Further, shape preserving approximation is enforced by specifying the lower and upper bounds of the derivative(s) of the splines on sub-intervals. Yet further, specific values of each spline and the spline's derivative is specified on a set of discrete data points.

In an example, the polynomial free-knot splines are constructed as linear combinations of B-splines. A B-spline is a combination of flexible bands that pass through a number of points, referred to as control points, in order to create smooth curves. As such, B-splines enable the creation of complex shapes using the control points. In this example, the model that uses the B-splines to fit the high-frequency side curve is defined by equation (3) as:

$$U = \Sigma_{all\ x}\{W(x)[y(x)-\Sigma_i a_i B_{i,k,t}(x)]\}^2 \quad (3)$$

The expressions for the polynomial pieces of the model are derived using the Cox-de Boor recursion formula defined by equations (4) and (5) as:

$$B_{i,0}(x) := \begin{cases} 1 & \text{if } t_i \leq x < t_{i+1} \\ 0 & \text{otherwise} \end{cases} \quad (4)$$

$$B_{i,k}(x) := \frac{x - t_i}{t_{i+k} - t_i} B_{i,k-1}(x) + \frac{t_{i+k+1} - x}{t_{i+k+1} - t_{i+1}} B_{i+1,k-1}(x) \quad (5)$$

In these equations, $W(x)$ is a weight, $Y(x)$ is the datum value at x; $a_i$ is a coefficient, B is a B-spline, and k is a polynomial spline of order k that provides a description in terms of its breaks. In this example, since the model is linear, the spline has an order of two.

In an example, the high-frequency side curve is approximated by three polynomials. As explained, doing so facilitates the detection of the three phases of frequency energy attenuation in locations that contain gas.

At step 210, method 200 involves based on a frequency-slope map of the calculated frequency slopes, determining for each location whether gas is present. The frequency-slope map is indicative of the high-side frequency slope at each location in the target formation. In an implementation, the respective high-frequency side slope of each frequency spectrum may be used to generate the frequency-slope map.

Once the frequency-slope map is generated, it is used to determine whether gas is present at the locations within the target formation. In an example, a location is determined to contain gas if the high-frequency side of the frequency spectrum of that location includes an abnormal high-frequency side slope. For instance, an "abnormal high-frequency side slope" is one that is abnormally high in comparison to other slopes (for example, slopes that are near the location or the majority of the other slopes in the target area).

The example method 200 shown in FIG. 2 can be modified or reconfigured to include additional, fewer, or different steps (not shown in FIG. 2), which can be performed in the order shown or in a different order. As an example, after step 210, a frequency-slope map of the target formation may be generated. In some implementations, the frequency-slope map can be displayed on a display device, perhaps of the computing device that is performing method 200. This map can be used to visually indicate locations that contain gas. In some implementations, the displayed map view (or the displayed cross-sectional view can be used to locate potential areas for drilling or to identify lateral extent of a reservoir). As another example, the method 200 may additionally involve drilling in one or more locations where gas is present. This step may involve providing information indicative of the one or more locations to a controller (for example, a computing device) of the drilling operations. Based on the information provided, the controller may control drilling equipment to drill in the one or more locations.

In some implementations, one or more of the steps shown in FIG. 2 can be repeated or reiterated, for example, until a terminating condition is reached. In some implementations, one or more of the individual steps shown in FIG. 2 can be executed as multiple separate steps, or one or more subsets of the steps shown in FIG. 2 can be combined and executed as a single step. In some implementations, one or more of the individual steps shown in FIG. 2 may also be omitted from the example method 200.

Figure 5:
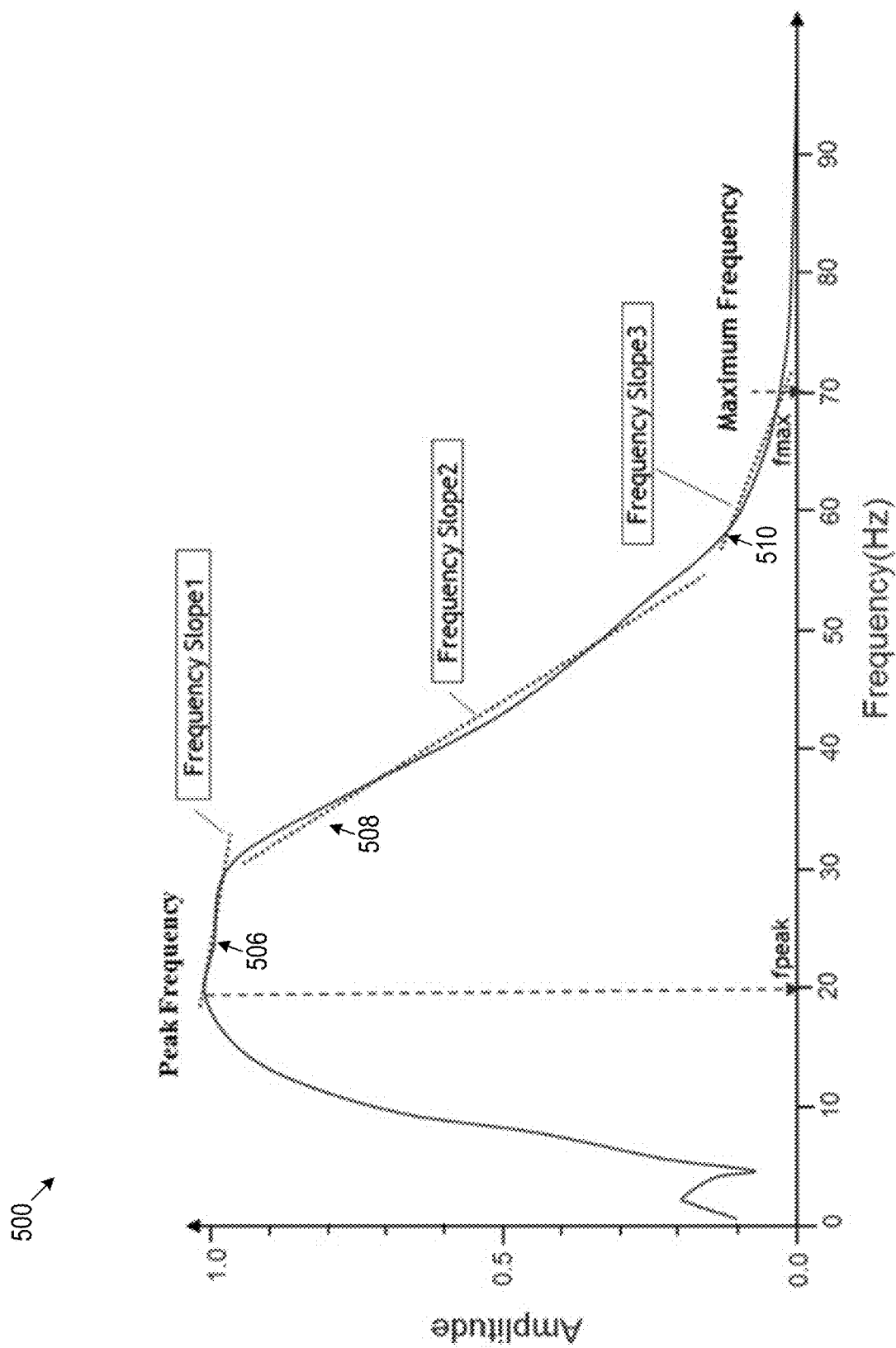
FIG. 5 illustrates frequency slopes of a constructed frequency spectrum, according to some implementations.

FIG. 5 illustrates a frequency spectrum 500, according to some implementations. Frequency spectrum 500 corresponds to a location within a target formation. As shown in FIG. 5, frequency spectrum 500 has a peak frequency at 20 Hz and a maximum frequency at 70 Hz. As also shown in FIG. 5, the high-frequency curve of the spectrum (between 20 Hz and 70 Hz) is approximated by three linear polynomials 506, 508, 510.

In order to determine whether the location contains gas, a frequency slope of between the peak frequency and the maximum frequency is calculated. Additionally, the three phases of energy attenuation may be characterized using each of the linear polynomials 506, 508, 510. In this example, the slope (labelled in FIG. 5 as "frequency slope 2") of the polynomial 508 is highest compared to the frequency slope 1 of the polynomial 506 and the frequency slope 3 of the polynomial 510. Accordingly, the frequency slope 2 of the polynomial 508 is selected to represent the energy attenuation at the location.

Once respective frequency slopes indicative of energy attenuation have been determined for locations in the target formation, each frequency slope is compared to other frequency slopes in order to determine whether the frequency slope is abnormal compared to other frequency slopes. In an example, each frequency slope is compared to other frequency slopes of locations near the area associated with the frequency slope. In another example, each frequency slope is compared to an average frequency slope of the other locations in the target formation.

Figure 6:
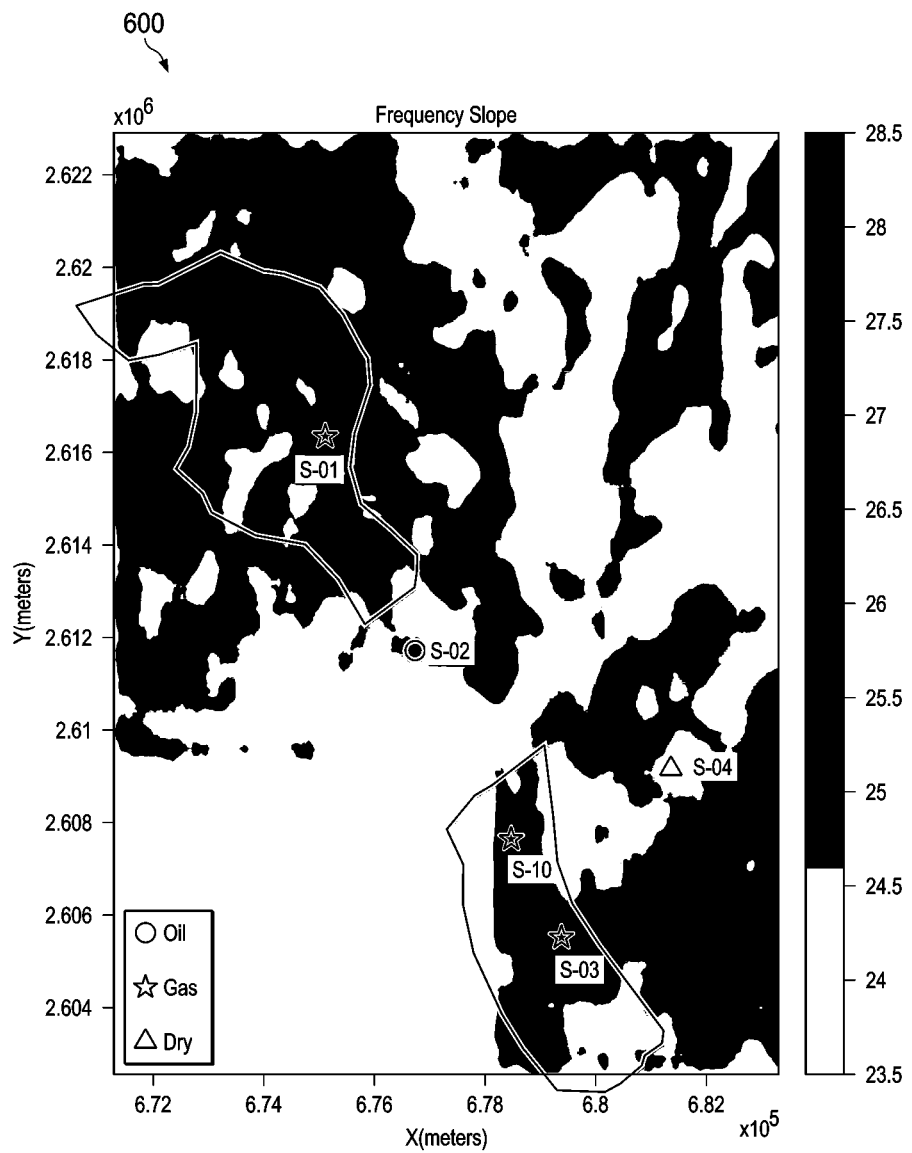
FIG. 6 illustrates a frequency slope map, according to some implementations.

FIG. 6 illustrates a frequency-slope map 600 of a target formation, according to some implementations. In an implementation, the frequency-slope map 600 is indicative of the high-frequency side slope (for example, the slope of the intensive energy attenuation phase) at each location. Furthermore, the frequency-slope map 600 is color-coded to indicate a degree of the high-side frequency slope at a particular location. For example, warm colors may indicate a high degree of slope, and therefore, may indicate an increased likelihood of hydrocarbon presence. Conversely, cool colors may indicate a lower frequency-slope degree, and therefore, may indicate a decreased likelihood of gas presence.

Furthermore, the frequency-slope map 600 may indicate potential well locations by imposing shapes on locations where there is a likelihood of gas being located. For example, as illustrated in FIG. 6, gas wells of S-01, S-03 and S-10 are imposed on the high-frequency slope area (warm color), oil well S-02 is imposed on a medium frequency slope area (moderate color), and dry well S-04 is imposed on the low frequency slope area (cool color). Furthermore, shapes, such as polygons, may be imposed on the map to indicate the outlines of reserved hydrocarbon reservoir.

Figure 7:
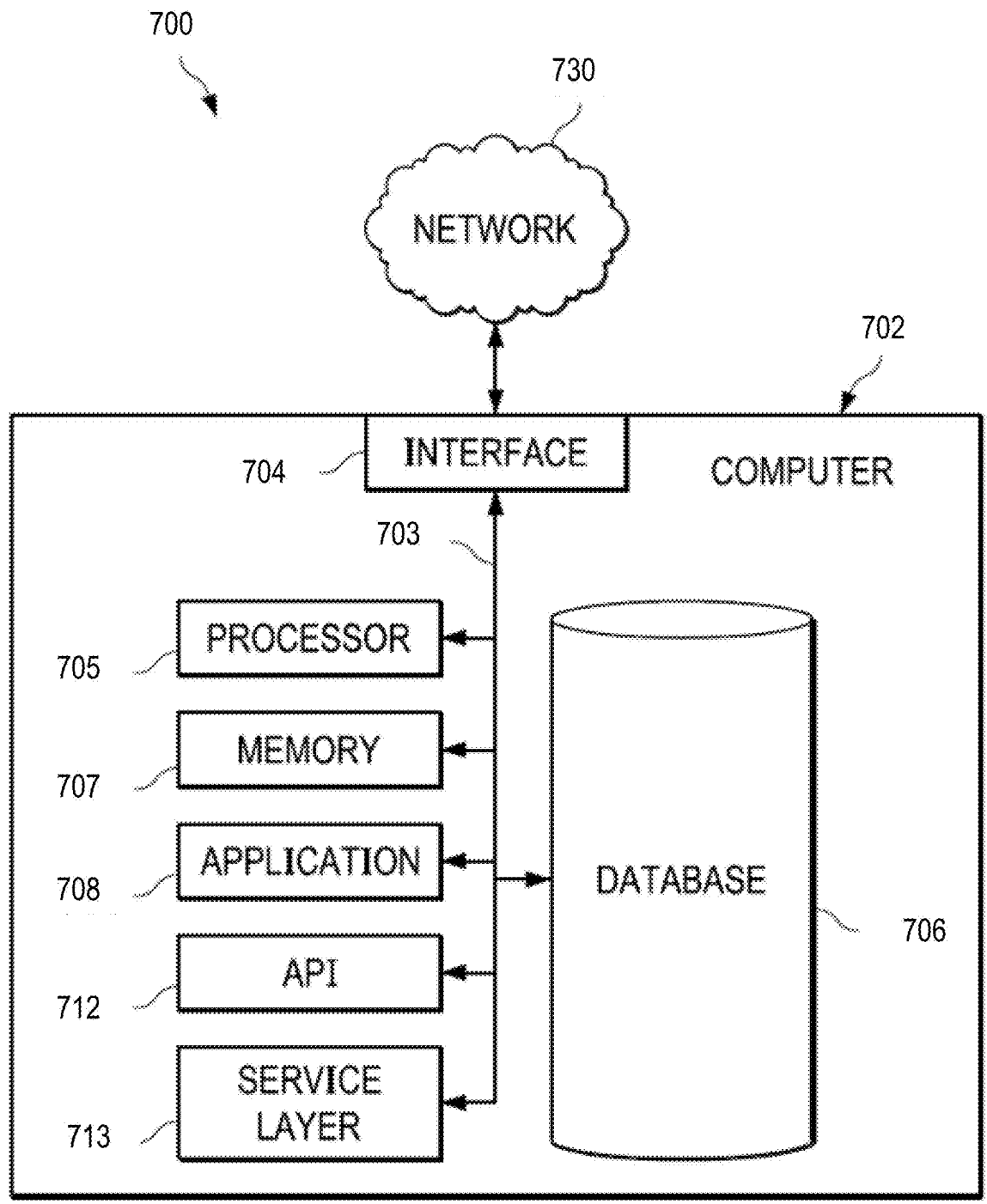
FIG. 7 illustrates a block diagram showing an example computer system used to provide computational functionalities associated with described algorithms, methods, functions, processes, flows, and procedures as described in the instant disclosure, according to some implementations.

FIG. 7 is a block diagram of an example computer system 700 used to provide computational functionalities associated with described algorithms, methods, functions, processes, flows, and procedures as described in the instant disclosure, according to an implementation. The illustrated computer 702 is intended to encompass any computing device such as a server, desktop computer, laptop/notebook computer, wireless data port, smart phone, personal data assistant (PDA), tablet computing device, or one or more processors within these devices, or any other suitable processing device, including physical or virtual instances (or both) of the computing device. Additionally, the computer 702 may comprise a computer that includes an input device, such as a keypad, keyboard, or touch screen, or other device that can accept user information, and an output device that conveys information associated with the operation of the computer 702, including digital data, visual, or audio information (or a combination of information), or a graphical user interface (GUI).

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, or global, or other environment (or a combination of environments).

The computer 702 is an electronic computing device operable to receive, transmit, process, store, or manage data and information associated with the described subject matter. According to some implementations, the computer 702 may also include or be communicably coupled with an application server, e-mail server, web server, caching server, or streaming data server, or other server (or a combination of servers).

The computer 702 can receive requests over network 730 from a client application (for example, executing on another computer) and respond to the received requests by processing the received requests using the appropriate software application(s). In addition, requests may also be sent to the computer 702 from internal users (for example, from a command console or by other appropriate access methods), external or third-parties, other automated applications, as well as any other appropriate entities, individuals, systems, or computers.

Each of the components of the computer 702 can communicate using a system bus 703. In some implementations, any or all of the components of the computer 702, both hardware or software (or a combination of hardware and software), may interface with each other or the interface 704 (or a combination of both) over the system bus 703 using an application programming interface (API) 712 or a service layer 713 (or a combination of the API 712 and service layer 713). The API 712 may include specifications for routines, data structures, and object classes. The API 712 may be either computer-language independent or dependent and may refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined functionalities through a defined interface. For example, the interface may be software written in JAVA, or C++, or other suitable language providing data in extensible markup language (XML) format or other suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module, without departing from the scope of this disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems that are connected to the network 730 (whether illustrated or not) in a distributed environment. Generally, the interface 704 comprises logic encoded in software or hardware (or a combination of software and hardware) and is operable to communicate with the network 730. More specifically, the interface 704 may comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors may be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a database 706 that can hold data for the computer 702 or other components (or a combination of both) that can be connected to the network 730 (whether illustrated or not). For example, database 706 can be an in-memory, or conventional, or other type of database storing data consistent with this disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases (of the same or combination of types) can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 707 that can hold data for the computer 702 or other components (or a combination of both) that can be connected to the network 730 (whether illustrated or not). For example, memory 707 can be random access memory (RAM), read-only memory (ROM), optical, magnetic, and the like, storing data consistent with this disclosure. In some implementations, memory 707 can be a combination of two or more different types of memory (for example, a combination of RAM and magnetic storage) according to particular needs, desires, or particular implementations of the computer 702 and the described functionality. Although illustrated as a single memory 707 in FIG. 7, two or more memories 707 (of the same or a combination of types) can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in this disclosure. For example, application 708 can serve as one or more components, modules, or applications. Further, although illustrated as a single application 708, the application 708 may be implemented as multiple applications 708 on the computer 702. In addition, although illustrated as integral to the computer 702, in alternative implementations, the application 708 can be external to the computer 702.

There may be any number of computers 702 associated with, or external to, a computer system containing computer 702, each computer 702 communicating over network 730. Further, the term "client", "user", and other appropriate terminology may be used interchangeably, as appropriate, without departing from the scope of this disclosure. Moreover, this disclosure contemplates that many users may use one computer 702, or that one user may use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS, or any other suitable conventional operating system.

A computer program, which may also be referred to or be described as a program, software, a software application, a module, a software module, a script, or code can be written in any form of programming language, including compiled or interpreted languages, or declarative or procedural languages, and it can be deployed in any form, including as a stand-alone program or as a module, component, or subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, or methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a ROM or a RAM, or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, such as, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20, or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, or in a single implementation. Conversely, various features that are described in the context of a single implementation can also be implemented in multiple implementations, separately, or in any suitable sub-combination. Moreover, although previously-described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously-described implementations should not be understood as requiring such separation or integration in all implementations, and it should be understood that the described program components and systems can generally be integrated together in a single software product or packaged into multiple software products.

Accordingly, the previously-described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

We claim:

1. A method comprising:
   receiving seismic data corresponding to a target formation;
   based on a time-frequency analysis of the seismic data, generating a representation of a time-variant frequency response of the seismic data;
   generating a frequency spectrum for each of one or more locations within the target formation using the representation of the time-variant frequency response;
   calculating a plurality of frequency slopes between a peak frequency and a maximum frequency of each frequency spectrum, wherein the plurality of frequency slopes are generated based on a plurality of polynomial free-knot splines that approximate a high-frequency curve between the peak frequency and the maximum frequency; and
   based on the plurality of frequency slopes, determining for each location whether gas are present.

2. The method of claim 1, wherein the time-frequency analysis is based on a continuous wavelet transform.

3. The method of claim 1, wherein the time-frequency analysis of the seismic data generates a time-scale map, and wherein generating a representation of a time-variant frequency response of the seismic data comprises:
   converting a time-scale map to the representation of the time-variant frequency response.

4. The method of claim 1, wherein the representation of the time-variant frequency response comprises n mono-frequency cubes, wherein each cube represents a time-variant response of each trace of the seismic data at a respective frequency.

5. The method of claim 4, wherein a frequency range of the n mono-frequency cubes is from $f_{min}$ to $f_{max}$, and wherein calculating $f_{max}$ comprises:
   performing spectral decomposition on the seismic data to generate an average frequency spectrum of the seismic data;
   identifying a peak frequency in the average frequency spectrum, wherein a peak amplitude occurs at the peak frequency;
   calculating a maximum amplitude as a product of the peak amplitude and a predetermined factor; and
   designating a frequency at which the maximum amplitude occurs as $f_{max}$.

6. The method of claim 1, wherein using the representation to generate a frequency spectrum for each of one or more locations within the target formation comprises:
   extracting, from the representation of the time-variant frequency response, frequency data corresponding to the location; and
   based on the extracted frequency data, constructing a frequency spectrum for the location.

7. The method of claim 1, wherein the method further comprises:
   based on the plurality of frequency slopes, generating a frequency-slope map of the target formation, wherein the frequency-slope map visually indicates, for each location, whether gas are present; and
   outputting the frequency-slope map on a display device.

8. A device comprising:
   a memory; and
   a processing unit that is arranged to perform operations including:
      receiving seismic data corresponding to a target formation;
      based on a time-frequency analysis of the seismic data, generating a representation of a time-variant frequency response of the seismic data;
      generating a frequency spectrum for each of one or more locations within the target formation using the representation of the time-variant frequency response;
      calculating a plurality of frequency slopes between a peak frequency and a maximum frequency of each frequency spectrum, wherein the plurality of frequency slopes are generated based on a plurality of polynomial free-knot splines that approximate a high-frequency curve between the peak frequency and the maximum frequency; and
      based on the plurality of frequency slopes, determining for each location whether gas are present.

9. The device of claim 8, wherein the time-frequency analysis is based on a continuous wavelet transform.

10. The device of claim 8, wherein the time-frequency analysis of the seismic data generates a time-scale map, and wherein generating a representation of a time-variant frequency response of the seismic data comprises:
    converting a time-scale map to the representation of the time-variant frequency response.

11. The device of claim 8, wherein the representation of the time-variant frequency response comprises n mono-frequency cubes, wherein each cube represents a time-variant response of each trace of the seismic data at a respective frequency.

12. The device of claim 11, wherein a frequency range of the n mono-frequency cubes is from $f_{min}$ to $f_{max}$, and wherein calculating $f_{max}$ comprises:
    performing spectral decomposition on the seismic data to generate an average frequency spectrum of the seismic data;
    identifying a peak frequency in the average frequency spectrum, wherein a peak amplitude occurs at the peak frequency;

calculating a maximum amplitude as a product of the peak amplitude and a predetermined factor; and designating a frequency at which the maximum amplitude occurs as $f_{max}$.

13. The device of claim 8, wherein using the representation to generate a frequency spectrum for each of one or more locations within the target formation comprises:

extracting, from the representation of the time-variant frequency response, frequency data corresponding to the location; and based on the extracted frequency data, constructing a frequency spectrum for the location.

14. The device of claim 8, wherein the operations further comprise:

based on the plurality of frequency slopes, generating a frequency-slope map of the target formation, wherein the frequency-slope map visually indicates, for each location, whether gas are present; and outputting the frequency-slope map on a display device.

15. A non-transitory computer-readable medium storing instructions executable by a computer system to perform operations comprising:

receiving seismic data corresponding to a target formation;

based on a time-frequency analysis of the seismic data, generating a representation of a time-variant frequency response of the seismic data;

generating a frequency spectrum for each of one or more locations within the target formation using the representation of the time-variant frequency response;

calculating a plurality of frequency slopes between a peak frequency and a maximum frequency of each frequency spectrum, wherein the plurality of frequency slopes are generated based on a plurality of polynomial free-knot splines that approximate a high-frequency curve between the peak frequency and the maximum frequency; and based on the plurality of frequency slopes, determining for each location whether gas are present.

16. The non-transitory computer-readable medium of claim 15, wherein the time-frequency analysis is based on a continuous wavelet transform.

17. The non-transitory computer-readable medium of claim 15, wherein the time-frequency analysis of the seismic data generates a time-scale map, and wherein generating a representation of a time-variant frequency response of the seismic data comprises:

converting a time-scale map to the representation of the time-variant frequency response.

18. The non-transitory computer-readable medium of claim 15, wherein the representation of the time-variant frequency response comprises n mono-frequency cubes, wherein each cube represents a time-variant response of each trace of the seismic data at a respective frequency.

19. The non-transitory computer-readable medium of claim 18, wherein a frequency range of the n mono-frequency cubes is from $f_{min}$ to $f_{max}$, and wherein calculating $f_{max}$ comprises:

performing spectral decomposition on the seismic data to generate an average frequency spectrum of the seismic data;

identifying a peak frequency in the average frequency spectrum, wherein a peak amplitude occurs at the peak frequency;

calculating a maximum amplitude as a product of the peak amplitude and a predetermined factor; and designating a frequency at which the maximum amplitude occurs as $f_{max}$.

20. The non-transitory computer-readable medium of claim 15, wherein using the representation to generate a frequency spectrum for each of one or more locations within the target formation comprises:

extracting, from the representation of the time-variant frequency response, frequency data corresponding to the location; and based on the extracted frequency data, constructing a frequency spectrum for the location.

* * * * *